United States Patent [19]

Watabe et al.

[11] Patent Number: 4,994,834
[45] Date of Patent: Feb. 19, 1991

[54] FOCAL PLANE SHUTTER FOR CAMERAS

[75] Inventors: Kenichi Watabe; Shigemi Takahashi; Toshihisa Saito; Akira Suzuki, all of Itabashi, Japan

[73] Assignee: Copal Company Limited, Tokyo, Japan

[21] Appl. No.: 491,115

[22] Filed: Mar. 9, 1990

[30] Foreign Application Priority Data

Mar. 10, 1989 [JP] Japan .............................. 1-26646[U]
Mar. 22, 1989 [JP] Japan .............................. 1-32491[U]

[51] Int. Cl.⁵ .......................... G03B 9/08; G03B 9/20
[52] U.S. Cl. .................................. 354/234.1; 354/262
[58] Field of Search .................... 354/234.1, 261, 262, 354/251

[56] References Cited

U.S. PATENT DOCUMENTS 4,171,897 10/1979 Fujita et al. ...................... 354/234.1
4,739,355 4/1988 Saito ............................... 354/251 X Primary Examiner—Michael L. Gellner
Assistant Examiner—Jae N. Noh
Attorney, Agent, or Firm—Spensley Horn Jubas & Lubitz

[57] ABSTRACT

The forcal plane shutter for cameras is equipped with a first release lever capable of retaining a rear blade group at position to close an exposure aperture, and a second release lever capable of maintaining a front blade group and the rear blade group at the unfolded position thereof and the folded position thereof respectively until the front blade group and the rear blade group are attracted and retained at the unfolded position and the folded position respectively securely with an electromagnetic device. The focal plane shutter is of a double light interruption type which has excellent response to the release signal and capable of assuring stable operations. The focal plane shutter further comprises a control means capable of retaining the first release lever in the released state thereof and can be set in a successive photographing mode accordingly.

2 Claims, 8 Drawing Sheets

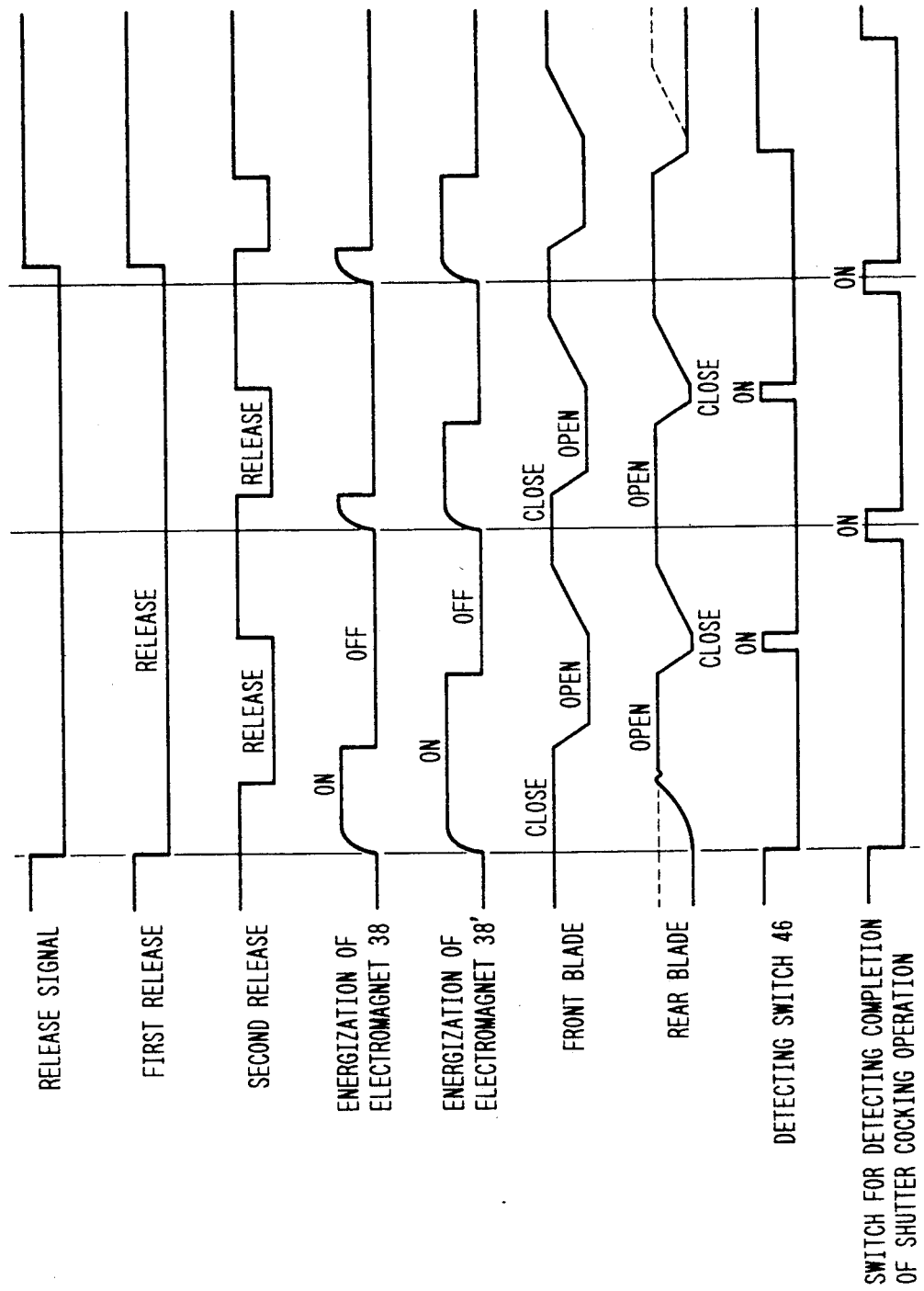

FOCAL PLANE SHUTTER FOR CAMERAS

BACKGROUND OF THE INVENTION (a) Field of the invention

The present invention relates to a focal plane shutter for cameras of a type wherein said shutter is equipped with a front blade group and a rear blade group, and adapted to permit double light interruption with these blade groups.

(b) Description of the prior art

In a general focal plane shutter of the above-mentioned type which is equipped with the front blade group and the rear blade group, light interruption onto the film surface is performed by covering an exposure aperture ordinarily with the front blade group in the shutter cocked state and with the rear blade group in the shutter uncocked state. Further, for the purpose of improving light interruption property and enhancing resistance to external stress, it is practiced to perform the so-called double light interruption, for which the exposure aperture is covered both with the front blade group and the rear blade group in the shutter cocked state. Especially in cases of cameras which have built-in film winders and are often left in the shutter cocked state, the necessity for the double light interruption becomes higher. In the conventional operating sequence for performing the double light interruption in the shutter cocked state, the unlocking operation for returning the rear blade group to the folded position thereof is performed after the shutter release operation and in the course of the returning travel of a cocking lever or an electromagnetic holding lever since the rear blade group must be returned to the folded position thereof at latest before the start of the travelling of the front blade group. Upon generation of a release signal by the shutter release operation, electromagnets for retaining the front blade group and the rear blade group at the unfolded position and the folded position thereof respectively are energized, and the front blade group and the rear blade group are once attracted to said electromagnets and then start the operations to open and close the exposure aperture in a predetermined time sequence.

However, the conventional focal plane shutter described above has a defect that said focal plane shutter cannot be used for high-speed successive photographing since the shutter allows a long time lag as measured from the generation of the shutter release signal to actual exposure start due to the time required until a current of a constant level flows to the electromagnets after the energizing of said electromagnets by the shutter release operation (or the release signal). In addition, the conventional focal plane shutter has another defect that the front blade group starts travelling before disappearance of the bound of the rear blade group which is caused when the rear blade group returns to the folded position thereof and stops at this position, thereby making the sequential operations very unstable.

SUMMARY OF THE INVENTION

A primary object of the present invention is to provide a focal plane shutter of the above-mentioned double light interruption type which is capable of assuring stable operations owing to enhancement in response to the release signal.

Another object of the present invention is to provide a focal plane shutter of the above-mentioned double light interruption type which is capable of permitting the high-speed successive photographing in response to the release signal.

The focal plane shutter according to the present invention is equipped with a first release lever capable of preventing travelling of the rear blade group which is kept at the position closing the exposure aperture and tends to return to the folded position thereof, and a second release lever for retaining the front blade group and the rear blade group at the unfolded position and the folded position respectively until the electromagnets are energized.

In the focal plane shutter according to the present invention, the first release lever prevents, at the shutter cocking stage, the rear blade group from returning to the folded position thereof to keep the exposure aperture in the covered state. On the other hand, the front blade group is brought to the unfolded position (the position covering the exposure aperture) by the shutter cocking operation, whereby the exposure aperture is set in the double light interruption state by both the blade groups upon completion of the shutter cocking operation. Upon generation of the shutter release signal by the shutter release operation, the first release lever is operated to allow the rear blade group to return to the folded position thereof, whereas the second release lever functions to retain the front blade group and the rear blade group at the unfolded and folded positions respectively until a current of a sufficient level flows to the electromagnets which have been energized upon generation of the release signal. Accordingly, both the blade groups are retained at the unfolded and folded positions without fail, and can thereafter start travelling for exposure in an adequate time sequence.

Further, the focal plane shutter according to the present invention is equipped with a control means which functions to bring the first release lever to an unlocked position thereof and hold said lever at said position only when the shutter is switched to a state permitting successive photographing. Accordingly, the rear blade group is not restricted by the first release lever and the mechanism to establish the double light interruption state is inoperative to allow the focal plane shutter to operate for successive photographing when the shutter is switched to the state for successive photographing.

These and other objects as well as the features and the advantages of the present invention will be apparent from the following detailed description of the preferred embodiments when taken in conjunction with the accompanying drawings.

BRIEF DESCRIPTION OF THE DRAWINGS

FIG. 9 is a time chart illustrating operating sequence in the successive photographing mode of the Embodiment 2 of the focal plane shutter according to the present invention.

DESCRIPTION OF THE PREFERRED EMBODIMENTS

Figure 1:
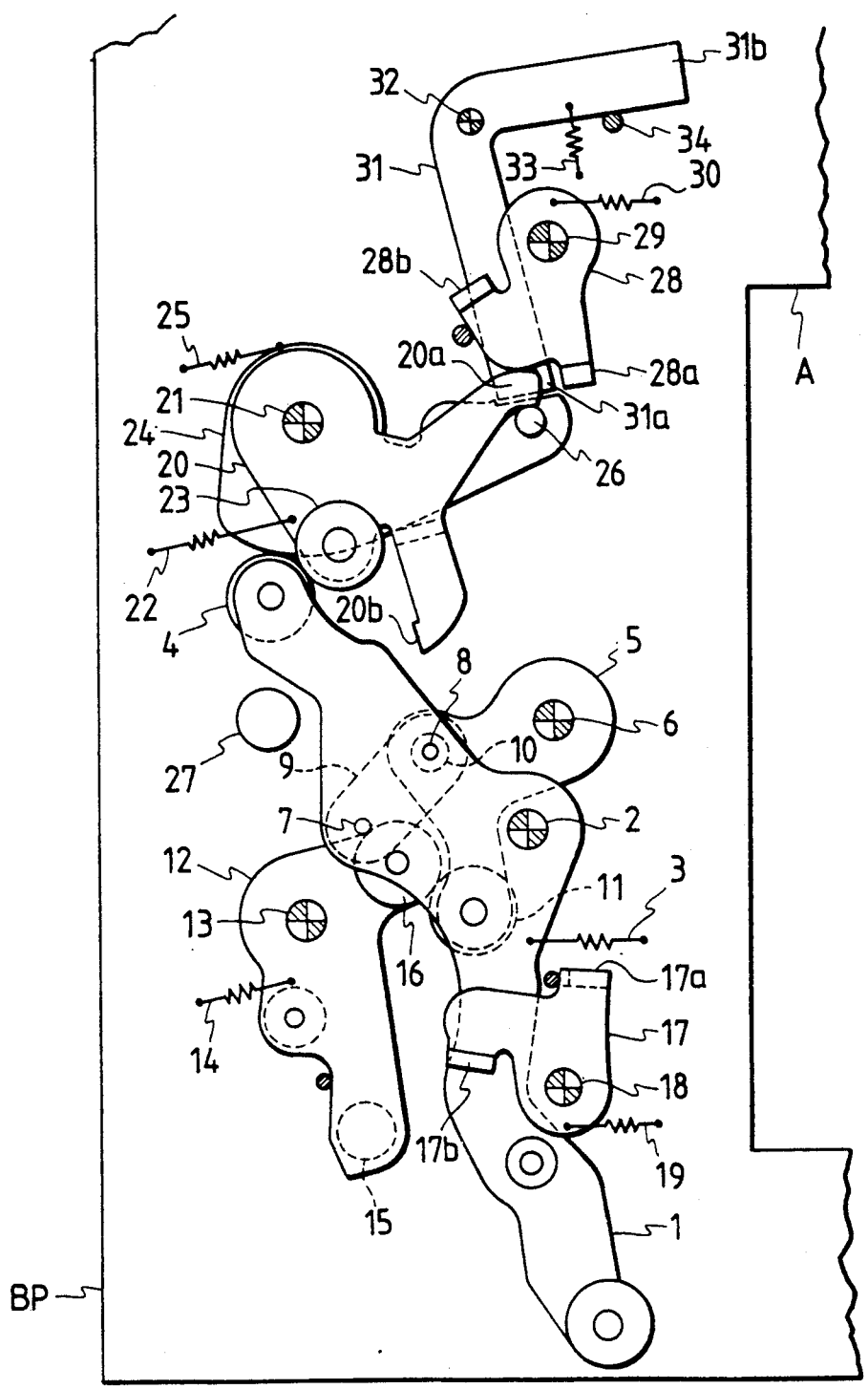
FIG. 1 is a plan view of the main parts illustrating the uncocked state of an Embodiment 1 of the focal plane shutter according to the present invention with the upper plate removed.
Figure 2:
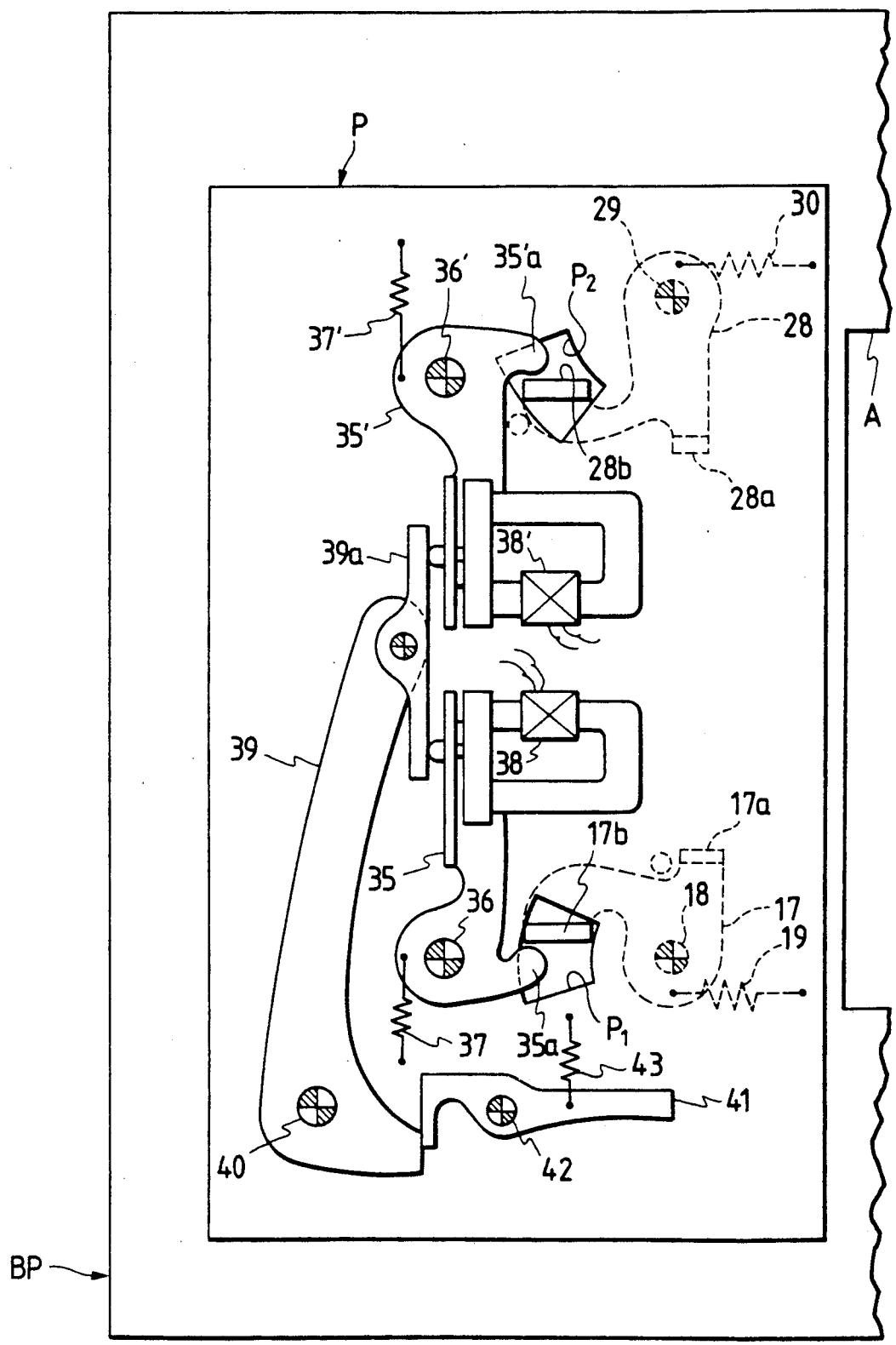
FIG. 2 is a plan view of the Embodiment 1 similar to FIG. 1 but with the upper plate attached.
Figure 3:
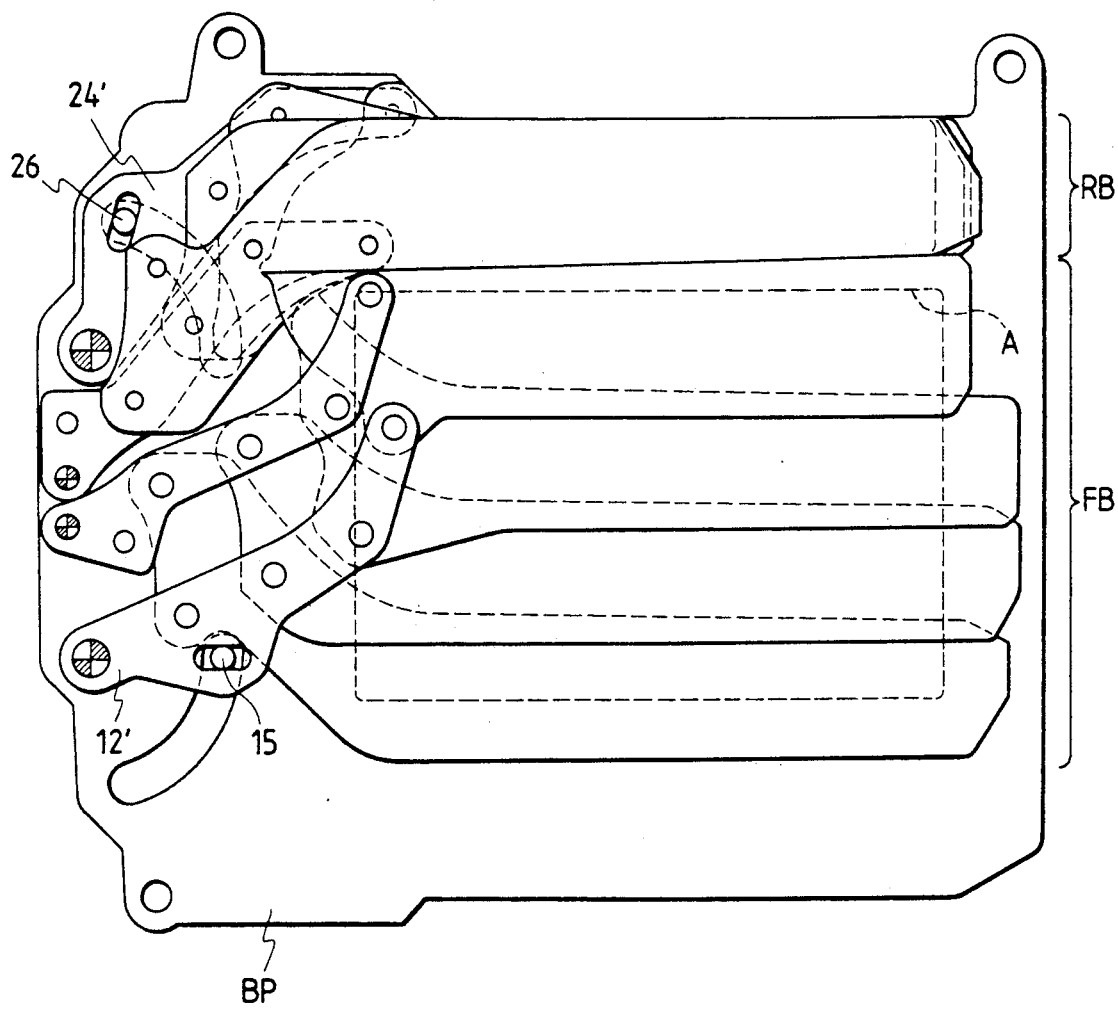
FIG. 3 is a plan view of a rear surface of a base plate, shown on a little contracted scale, illustrating the state thereof immediately after the shutter release operation wherein the exposure aperture is closed only with a front blade group.

Now, the Embodiment 1 of the focal plane shutter according to the present invention will be described with reference to FIG. 1 through FIG. 4. FIG. 1 shows an uncocked state, wherein all the component members to be described below are arranged on a base plate BP having an exposure aperture A. The reference numeral 1 represents a main cocking lever which is used to compose a cocking member together with an auxiliary cocking lever to be described later, pivoted around a shaft 2, biased counterclockwise by a spring 3, and so arranged as to be rotatable between the position shown in FIG. 1 and a cocked position located further clockwise. The reference numeral 4 designates a roller which is pivoted on the main cocking lever 1 and engageable with a roller of a rear blade actuating arm described later, the reference numeral 5 denotes an auxiliary cocking lever which is pivoted by a shaft 6, and connected to the main cocking lever 1 by connecting pivots 7 and 8 through a connecting lever 9, the reference numeral 10 represents a roller pivoted by the connecting pivot 8, the reference numeral 11 designates a roller which is pivoted on the auxiliary cocking lever 5 and engageable with a roller of a front blade actuating arm described later, the reference numeral 12 denotes a front blade actuating arm which is pivoted around a shaft 13, biased clockwise by a spring 14 and engaged with a stopper so as not to rotated further clockwise in the state illustrated in FIG. 1, the reference numeral 15 represents a pin which is erected on the front blade actuating arm 12 and functions to actuate the front blade group FB by way of the front blade operating arm 12', the reference numeral 16 designates a roller which is pivoted by a shaft on the front blade actuating arm 12 and engageable with the roller 11, and the reference numeral 17 denotes a front blade locking lever which is pivoted by a shaft 18 and biased counterclockwise by a spring 19. The reference numeral 20 represents a rear blade actuating arm which is pivoted by a shaft 21, biased clockwise by a spring 22, and equipped with an operating portion 20a for actuating a rear blade operating lever described later and a locked portion 20b to be looked by a rear blade locking lever described later, the reference numeral 23 designates a roller which is pivoted by the rear blade actuating arm 20 and engageable with the roller 4 of the main cocking lever 1, and the reference numeral 24 denotes a rear blade operating lever which is pivoted by a shaft 21, biased counterclockwise by a spring 25, and equipped with a pin 26 engageable with the operating portion 20a of the rear blade actuating arm. The spring 22 for biasing the rear blade actuating arm 20 is so arranged as to have a force larger than that of the spring 25 for biasing the rear blade operating lever 24. The pin 26 on the rear blade operating lever 24 is so designed as to actuate the rear blade group RB by way of the rear blade operating arm 24', and the rear blade group closes the exposure aperture A of the focal plane shutter in the state illustrated in FIG. 1 wherein the rear blade operating lever 24 is biased to the clockwise limit. The reference numeral 27 represents a stopper pin for preventing the main cocking lever 1 from rotating counterclockwise, and the reference numeral 28 designates a rear blade locking lever which is pivoted by a shaft 29, biased clockwise by a spring 30 and prevented from rotating further clockwise by a stopper in the state illustrated in FIG. 1. Formed on the rear blade locking lever 28 is a locking portion 28a for locking the locked portion 20b of the rear blade actuating arm 20. The reference numeral 31 represents a first release lever which is pivoted by a shaft 32, biased clockwise by a spring 33 and prevented from rotating further clockwise by a stopper 34. The first release lever 31 has a locking portion 31a engageable with the tip of the rear blade operating lever 24, and is rotated counterclockwise to disengage the locking portion 31a from the rear blade operating lever 24 when the other end 31b is pushed or attracted by a manual member or an electromagnetic device (not shown). FIG. 2 shows an example of an electromagnetic device for operating the front blade locking lever 17 and the rear blade locking lever. The reference symbol P represents an upper plate which is fixed over the base plate BP with a predetermined distance reserved therefrom, and formed in which are an arcuate opening $P_1$ for allowing protrusion of an upward-folded end 17b of the front blade locking lever 17 and an arcuate opening $P_2$ for allowing protrusion of an upward-folded end 28b of the rear blade locking lever 28. As is understood from this description, all the component parts illustrated in FIG. 1 and described above are arranged between the base plate BP and the upper plate P, whereas all the component parts, except the front blade locking lever 17 and the rear blade locking lever 28, illustrated in FIG. 2 are arranged on the upper plate P. In FIG. 2, the front blade locking lever 17 and the rear blade locking lever 28 are shown in the state corresponding to that illustrated in FIG. 1 wherein the stopper prevent the front and rear blade locking levers from rotating counterclockwise and clockwise respectively. The reference numeral 35 represents an armature lever which is pivoted by a shaft 36, biased counterclockwise by a spring 37 and equipped with an engaging portion 35a engageable with the end 17b of the front blade locking lever 17, and the reference numeral 38 designates an electromagnet which is capable of attracting and retaining the armature lever 35 in the state shown in FIG. 2. The armature lever 35, the shaft 36, the spring 37 and the electromagnet 38 composes, together with an armature lever 35', a shaft 36', a spring 37' and an electromagnet 38' composed similarly to the component parts described above, an electromagnetic device which functions to perform the exposure operations. The reference numeral 39 represents a holding lever which is pivoted by a shaft 40 and capable of retaining the armature levers 35 and 35' in the attracted state by way of a pressed piece 39a, and the reference numeral 41 designates a second release lever which is pivoted by a shaft 42, biased counterclockwise by a spring 43 and capable of locking the holding lever 39 in the state illustrated in FIG. 2. The second uncocking lever is so designed as to be rotated clockwise from the position illustrated in FIG. 2 in conjunction, for example, with the mirror-up operation. In FIG. 1 and FIG. 2, the front blade group FB, the front blade operating arm 12', the rear blade group RB and the rear blade operating arm 24' are arranged on the rear surface of the base plate BP. Accordingly, the pins 15 and 26 protrude through the rear surface of the base plate BP, and pin-shot connected to the front blade operating arm 12' and the rear blade operating arm 24' respectively.

Now, operations of the Embodiment 1 of the focal plane shutter according to the present invention will be described. When the main cocking lever 1 is rotated clockwise in the state illustrated in FIG. 1, the auxiliary cocking lever 5 is also rotated clockwise by way of the connecting lever 9. By the clockwise rotations of these main cocking levers 1 and 5, the roller 4 of the main cocking lever 1 and the roller 11 of the auxiliary cocking lever 5 are brought into contact with the roller 23 of the rear blade actuating arm 20 and the roller 16 of the front blade actuating arm 12 respectively, whereby the front blade actuating arm 12 is rotated counterclockwise to move the front blade group from the position keeping the exposure aperture A open to the position to close the exposure aperture A, and the end of the front blade actuating arm 12 having the pin 15 is locked by the locking portion 17a of the front blade locking lever 17 and kept in this state. On the other hand, the locked portion 20b of the rear blade actuating arm 20 which is rotated counterclockwise by the roller 4 is locked by the locking portion 28a of the rear blade locking lever 28 and the rear blade actuating arm 20 itself is retained in this state. However, since the rear blade operating lever 24 is locked by the locking portion 31a of the first release lever 31 and prevented from rotating counterclockwise though the rear blade operating lever 24 is biased by the spring 25, the focal plane shutter is retained in the state illustrated in FIG. 1, i.e., the rear blade group RB is retained in the position keeping the exposure aperture closed. Accordingly, there is established the double light interruption state where the exposure aperture A is closed by both the front blade group FB and the rear blade group RB upon completion of the shutter cocking operation.

Figure 4:
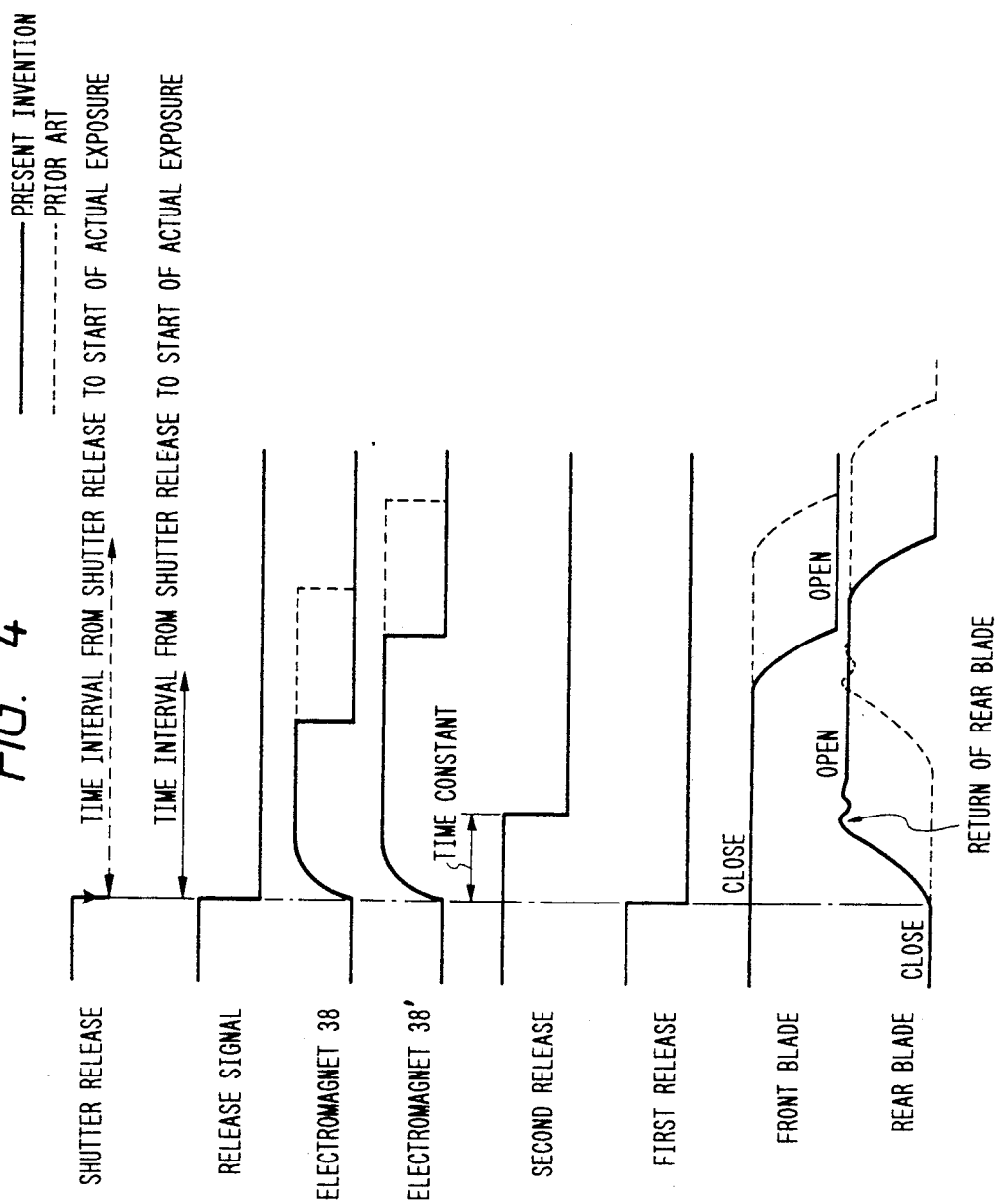
FIG. 4 is a time chart illustrating the operating sequence of the main parts of the focal plane shutter shown in FIG. 1 and FIG. 2.

Now, sequence of the operations to be performed by uncocking the shutter will be described with reference to FIG. 4. Upon uncocking the shutter, the first release lever 31 is rotated counterclockwise by the electromagnetic device to disengage the locking portion 31a from the rear blade operating lever 24, whereby the rear blade operating lever 24 is rotated counterclockwise by the spring 25 and the rear blade group RB is returned immediately to the folded position (the position keeping the exposure aperture open). On the other hand, the front blade group FB is retained in the position to close the exposure aperture A at this time (See FIG. 3). Though energizing of the electromagnets 38 and 38' is started upon generation of the release signal, the holding lever 39 presses the armature levers 35 and 35' to the poles of the electromagnets 38 and 38', and the armature levers 35 and 35' are retained in the attracted state without fail even during the rise time of the current supplied to the electro-magnets 38 and 38' shown in FIG. 3 (during lapse of a time determined by a time constant). After at least the time corresponding to a time constant has lapsed in the state where the exposure aperture A is closed only by the front blade group FB, the second release lever 41 is rotated clockwise by a mechanical or electromagnetic device, whereby the holding lever 39 releases the armature levers 35 and 35' from the restricting function thereof. Thereafter, the current supplied to the electro-magnets 38 and 38' is turned off at a predetermined time interval, and the front blade locking lever 17 and the rear blade locking lever 28 operate to allow the front blade group FB and the rear blade group RB to start exposure in an adequate time sequence. Owing to the design to compose the first release lever 31 and the second release lever 41 separately, the present invention has succeed in remarkably shortening the time required from the shutter release operation to actual exposure start as compared with that available by the prior art (See FIG. 4). As a result, the focal plane shutter according to the present invention permits increasing photographing operations per second and controlling exposure time with high stability.

Figure 5:
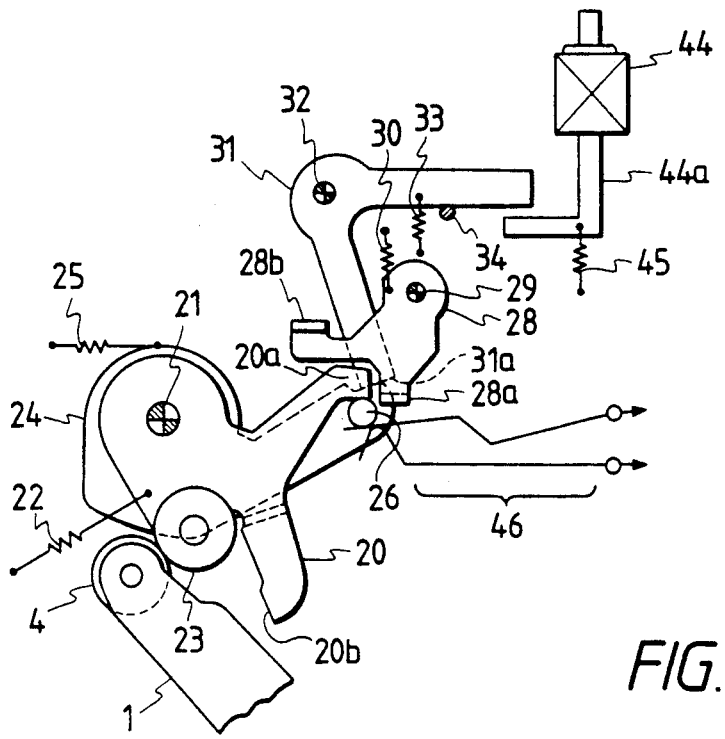
FIG. 5 through FIG. 7 are partial plan views illustrating an Embodiment 2 of the focal plane shutter according to the present invention.
Figure 6:
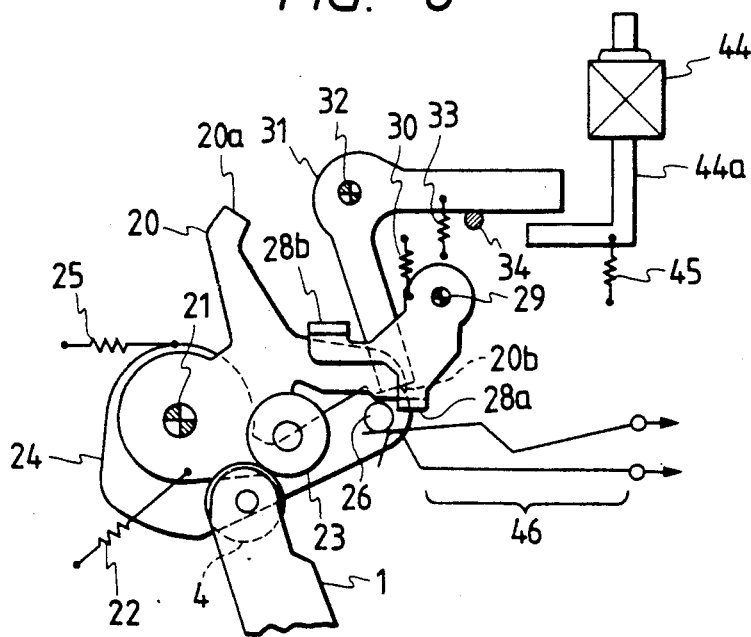
Figure 7:
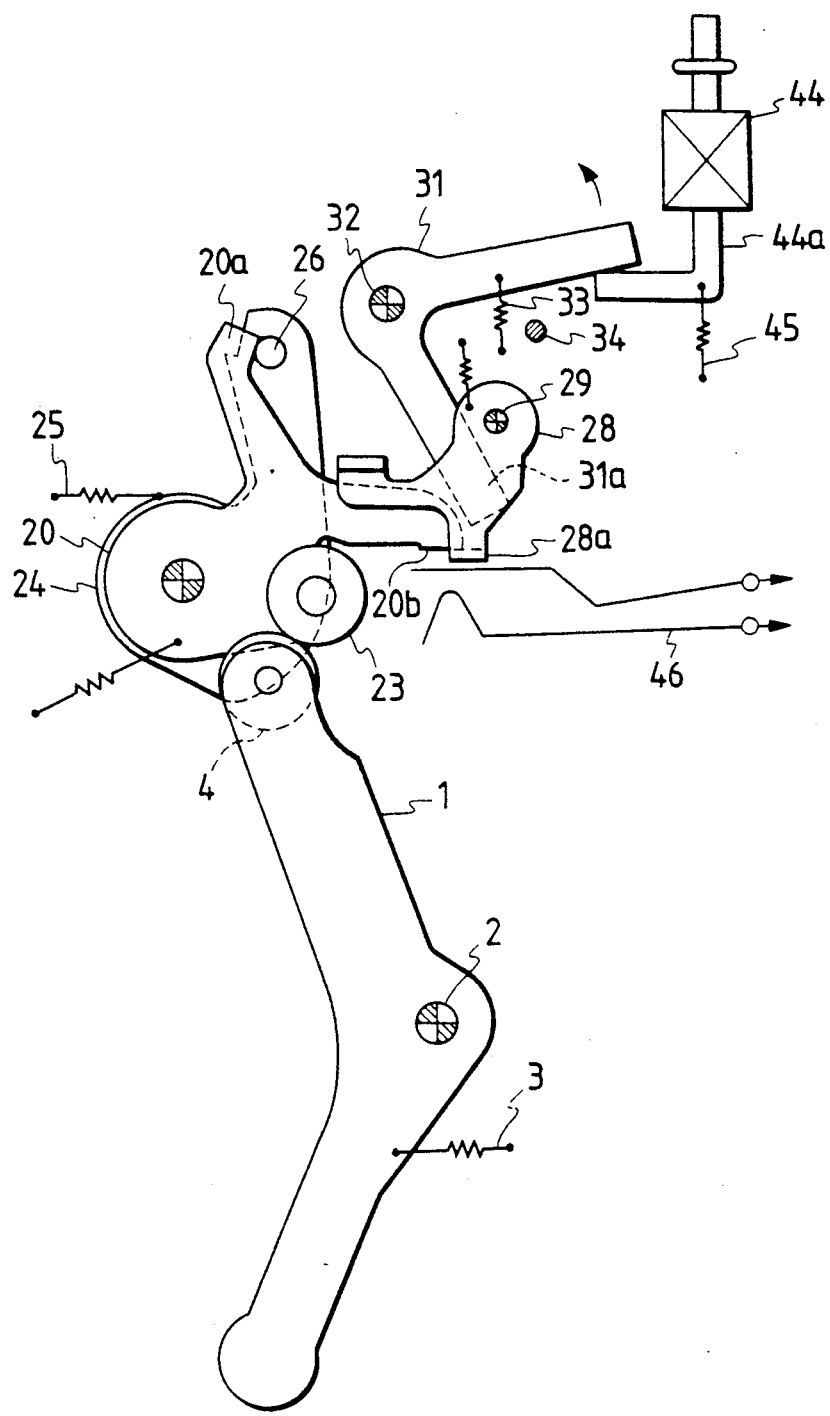

Now, the Embodiment 2 of the focal plane shutter according to the present invention will be described with reference to FIG. 5 through FIG. 9. The Embodiment 2 also uses the mechanism illustrated and described above as the Embodiment 1. For avoiding repetition of the description, composition of the Embodiment 2 will be described only on the parts constituting characteristics thereof, and functions of the Embodiment 2 will be explained below also with reference to FIG. 1 through FIG. 3. In FIG. 5 through FIG. 7, the reference numeral 44 represents an electromagnetic control means which is arranged on a camera body (not shown) and functions to rotate the first release lever 31 by attracting (displacing upward) a plunger 44a against a spring 45 and engaging its with the other end 31b of the first release lever 31 when the control means is energized, and the reference numeral 46 designates a normally open detecting switch adapted to be turned ON upon completing travelling of the rear blade group RB by the pin 26 erected on the rear blade operating lever 24. The other component parts of the mechanism are quite the same as those used in the Embodiment 1.

Figure 8:
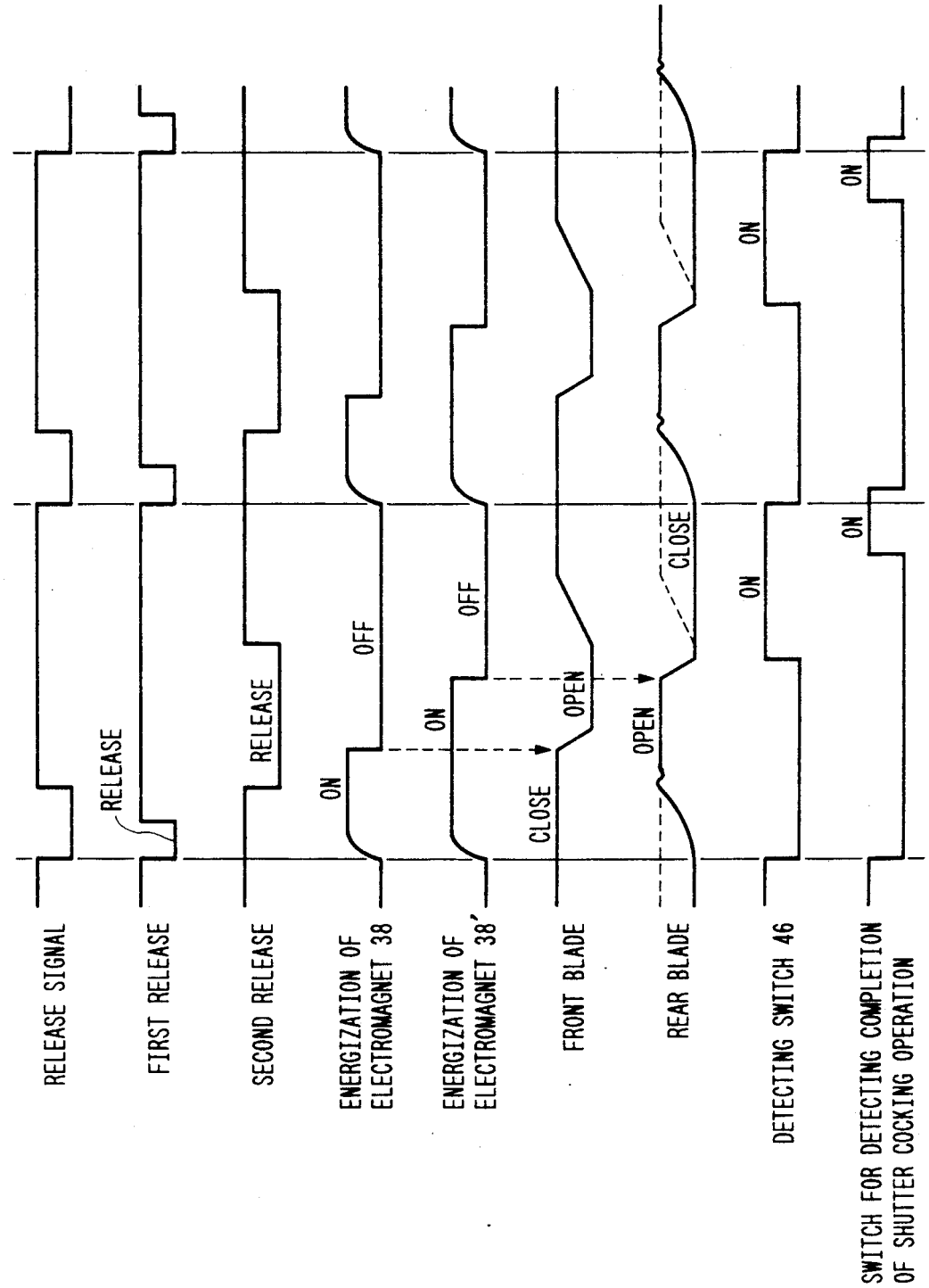
FIG. 8 is a time chart illustrating operating sequence in the non-successive photographing mode of the Embodiment 2 of the focal plane shutter according to the present invention.

Functions of the Embodiment 2 in the nonsuccessive photographing mode will be described with reference to FIG. 8. FIG. 5 illustrates the state of the Embodiment 2 corresponding to that shown in FIG. 1. When the main cocking lever 1 is rotated clockwise in this state, each of the component parts is operated as already described and brought to the position illustrated in FIG. 6, and the exposure aperture A is closed by both the front blade group FB and the rear blade group RB for double light interruption.

When the shutter is released in this double light interruption state, a pulse voltage is applied to the control means 44 upon generation of the release signal and the plunger 44a is attracted as shown in FIG. 6, whereby the first release lever 31 is rotated counterclockwise to disengage the locking portion 31a, the rear blade operating lever 24 is rotated counterclockwise under the force of the spring 25, the rear blade group RB is returned to the folded position (position keeping the exposure aperture open) and the detecting switch 46 is turned OFF. Then, each of the component parts operates as already described to perform a single exposure operation and returns to the state illustrated in FIG. 1. At this time, the first release lever 31 has returned to the position shown in FIG. 5 since the pulse voltage is applied to the control means 44.

Now, functions of the Embodiment 2 in the successive photographing mode will be described with reference to FIG. 9. In the successive photographing mode, a voltage is applied to the control means continuously for a predetermined time under an AND condition between release signals emitted by release operations and a successive photographing signal emitted upon switching from the non-successive photographing mode to the successive photographing mode. Accordingly, the plunger 44a is kept in the attracted state to retain the first release lever 31 at the position shown in FIG. 7. Therefore, the rear blade operating lever 24 is not locked by the first release lever 31 at the shutter cocking stage but operated together with the rear blade actuating arm 20. Accordingly, the rear blade group RB immediately opens the exposure aperture A without closing said aperture. In the successive photographing mode, the time interval between successive photographing operations is shortened by omitting the sequence corresponding to the double light interruption. A plural number of exposure operations are performed for the above-mentioned predetermined time. The moment that the release signal for the last exposure operation in the successive photographing mode is turned OFF, the voltage application to the control means 44 is stopped, and the focal plane shutter is set again in the double light interruption state by releasing the successive photographing mode under the AND condition between the ON signal from the detecting switch 46 for detecting completion of travelling of the rear blade group and an ON signal from a switch (not shown) for detecting completion of the shutter cocking operation on the camera.

What is claimed is:

1. A focal plane shutter for cameras comprising a front blade group and a rear blade group capable of opening and closing an exposure aperture, and an electromagnetic device capable of sequentially operating said front blade group and said rear blade group, wherein said focal plane shutter for camera is equipped with a first release means for retaining said rear blade group tending to return to the folded position thereof at a position to close said exposure aperture, and a second release means adapted to be capable of maintaining said front blade group and said rear blade group at the unfolded position and the folded position respectively until said front blade group and said rear blade group are retained at the folded position and the unfolded position respectively by said electromagnetic device.

2. A focal plane shutter for cameras according to claim 1 further comprising a control means capable of retaining said first release means in the released state thereof for setting said plane shutter in a successive photographing mode.

* * * * *